United States Patent [19]

Prince

[11] Patent Number: 5,088,674
[45] Date of Patent: Feb. 18, 1992

[54] BRACKET FOR WALL MOUNTING A COMPACT DISK CASE

[75] Inventor: Kevin R. Prince, San Juan Capistrano, Calif.

[73] Assignee: Vertical Designs, Inc., Newport Beach, Calif.

[21] Appl. No.: 557,160

[22] Filed: Jul. 23, 1990

[51] Int. Cl.$^5$ .............................................. A47K 1/08
[52] U.S. Cl. .............................. 248/311.2; 248/221.4
[58] Field of Search .................... 248/311.2, 313, 310, 248/231.4, 316.2, 221.4; 206/307, 309, 313, 232; 220/481

[56] References Cited

U.S. PATENT DOCUMENTS

| | | | |
|---|---|---|---|
| 2,263,956 | 11/1941 | Russell | 248/311.2 |
| 2,268,964 | 1/1942 | Saffell | 248/311.2 X |
| 3,372,717 | 3/1968 | Fisher | 220/481 X |
| 3,844,444 | 10/1974 | Carroll | 248/311.2 X |
| 4,346,865 | 8/1982 | Murata | 248/313 X |
| 4,865,190 | 9/1989 | Gregerson et al. | 206/309 |
| 4,875,652 | 10/1989 | Bosse | 248/311.2 |
| 4,881,640 | 11/1989 | Herr et al. | 206/313 |
| 4,892,189 | 1/1990 | Kunimune et al. | 206/232 |

FOREIGN PATENT DOCUMENTS

| | | | |
|---|---|---|---|
| 3425579 | 1/1986 | Fed. Rep. of Germany | 206/307 |
| 702883 | 1/1954 | United Kingdom | 248/311.2 |

*Primary Examiner*—J. Franklin Foss

[57] ABSTRACT

A bracket is provided for supporting a conventional case for a Compact Disk. The bracket mounts against a flat surface such as a wall and holds the case so that the artwork on the case cover is visible. The bracket has a base and a pair of arms on opposite sides of the base that extend away from the mounting surface. Each arm has a lip extending toward the opposing arm to clamp one portion of the case. A first lip clamps the case on a portion of the case's top surface proximate a hinged case end, while a second lip clamps on a small flange on the side of the case opposite its hinged end. The first lip has a low profile allowing the case cover to be fully opened to access the Compact Disk therein, without removing the case from the bracket. The second lip has a sloping top surface that contacts the flange of the case during insertion of the case into the bracket. Insertion pressure of the case flange against the sloping surface forces the second lip to temporarily flex away from the case permitting the case to snap into place under the second lip.

3 Claims, 2 Drawing Sheets

BRACKET FOR WALL MOUNTING A COMPACT DISK CASE

FIELD OF THE INVENTION

Generally, the invention relates to storage and display of entertainment media such as audio and video recordings. Specifically, the invention relates to a device for holding a Compact Disk for storage and particularly for display of the case cover art.

BACKGROUND AND DESCRIPTION OF THE PRIOR ART

Permanent storage of the standard Compact Disk or CD, like its predecessor, the recorded phonograph disk is accomplished by placing the disk into a protective container. The CD container is typically a plastic box having a means for holding the CD, and a hinged cover for access. With the cover in the closed position, the case is a rectangular box. The inside of the cover has a slot for holding printed material such as a cover artwork or a booklet describing the contents of the CD or other information or art. The cover includes the entire top surface of the case except for a narrow strip at one side that is perpendicularly oriented relative to the top surface. The cover is hinged to open such that it can swing through an arc of 180 degrees and lay flat open much like a book.

Like the phonograph record, storage devices for a collection of CDs include cabinets, boxes and shelves, shoulder bags, files and all manner of holders. The important parameters involved in the storage of a collection of media such as the CD are compactness, protection and ease of use including finding, retrieval and replacement of a chosen item from the collection. To achieve the first two requirements, storage devices for collections most often are configured with parallel adjacent slots for insertion of the media cases. This form of storage has the great advantages of compactness with high space utility and low cost per stored item. It suffers the drawback of covering the cover art so that it is not visible during a search. The significance of this drawback can be understood if it is realized that to the collection owner, the content of a given disk becomes most closely related to the visual cover art and not to the written title. A second aspect of the inability of collection storage device to display the cover art is the drawback of not being able to enjoy this art for its aesthetic value except when it is removed from the collection. An alternate collection storage device holds the individual CD cases one behind the other much like cards in a file box. In this type of holder one has the opportunity to see the cover artwork of each CD in sequence but not all at the same time.

In summary, the prior art includes a variety of CD collection support or storage devices but none permit display of the artwork or cover designs of the entire collection at the same time, thereby forming a more or less permanent art exhibit. A second drwaback of prior art storage devices is that upon selecting a specific CD for play, the individual case containing the CD must be removed from the collection. This opens the possibility for misplacing the CD case or misfiling it upon returning it to the collection.

SUMMARY OF THE INVENTION

The invention disclosed herein is a bracket for supporting the standard CD storage case which is referred to in the music industry as the "Jewel Case". The bracket attaches to a flat mounting surface such as a wall and holds one CD case so that the cover artwork faces away from the mounting surface. In this way an entire CD collection, each case held in one bracket, can be displayed on a wall. This provides an audiophile considerable advantage over conventional collection storage devices in finding and selecting a particular CD for play, as well as for experiencing the joy of displaying the collection as an art exhibit. The walls of bedrooms, family rooms and music rooms are natural examples where such an art exhibit would become a welcome addition to the decor.

The bracket has a base and a pair of arms which originate on opposite sides of the base and extend away from the mounting surface. Each arm has a lip extending toward the opposing arm to clamp against one surface of the CD case. When the case is held in the normal orientation for viewing or reading the cover artwork, the two lips are at the left and right sides of the case respectively. The left side lip clamps against the case's top surface at a point that is not part of the hinged cover, while the right side lip clamps on a small flange on the right side of the case. The left side lip has a low profile allowing passage of the case's cover when it is opened to access the interior of the case for removal of the CD. Therefore the case may remain within the bracket at all times. The right side lip has a sloping top surface for cooperating with the flanged edge of the case during insertion of the case into the bracket. Insertion pressure of the case's flanged edge against the sloping surface forces the right side arm to temporarily flex away from the case permitting the small flange of the case to snap into place under the right side lip.

Once mounted on the wall, the case cover may be opened a full 180 degrees to expose the CD and the back of the cover. A dual CD Jewel Case may be mounted on the bracket in the same manner as the single CD Jewel Case. The top cover of the dual case may be opened 180 degrees also, thereby, exposing both CD's.

Thus the invention permits an existing wall to become a convenient storage and display facility for a CD collection. Since four cases may be easily stored on each square foot of wall space, a wall area 5 feet high by 10 feet long, can store at least 200 cases. At today's prices such a collection would cost about $3000, a considerable investment indeed; deserving of display as an art form. The CD case can be easily inserted into, and removed from the bracket for storage or use elsewhere, or for rearranging the display. The CD can be easily removed from the CD case for playback without disruption of the order or position of the case in the collection, since the case itself, advantageously, need not be removed from the bracket. CD cases may be arranged on a wall in artistic groupings such as in circles, or other geometric or appealing arrangements or they may be arranged on the wall in groupings according to content or other attributes such as by date acquired or country of origin. Since CD case covers usually display art such as renderings of the artists or scenes of the places or things depicted in the media, it is a great advantage to be able to display these covers in a more or less permanent manner. Having immediate access to the case cover art of a CD collection is a great improvement over having access to only the CD title which is printed on the spine of the case. The cover art helps in recalling the nature and type of material contained in each CD.

The bracket is small enough to be unobvious when viewing the CD case on the wall.

Other features and advantages of the present invention will become apparent from the following more detailed description, taken in conjunction with the accompaying drawings, which illustrate, by way of example, the principles of the invention.

DETAILED DESCRIPTION OF THE PREFERRED EMBODIMENT

Figure 1:
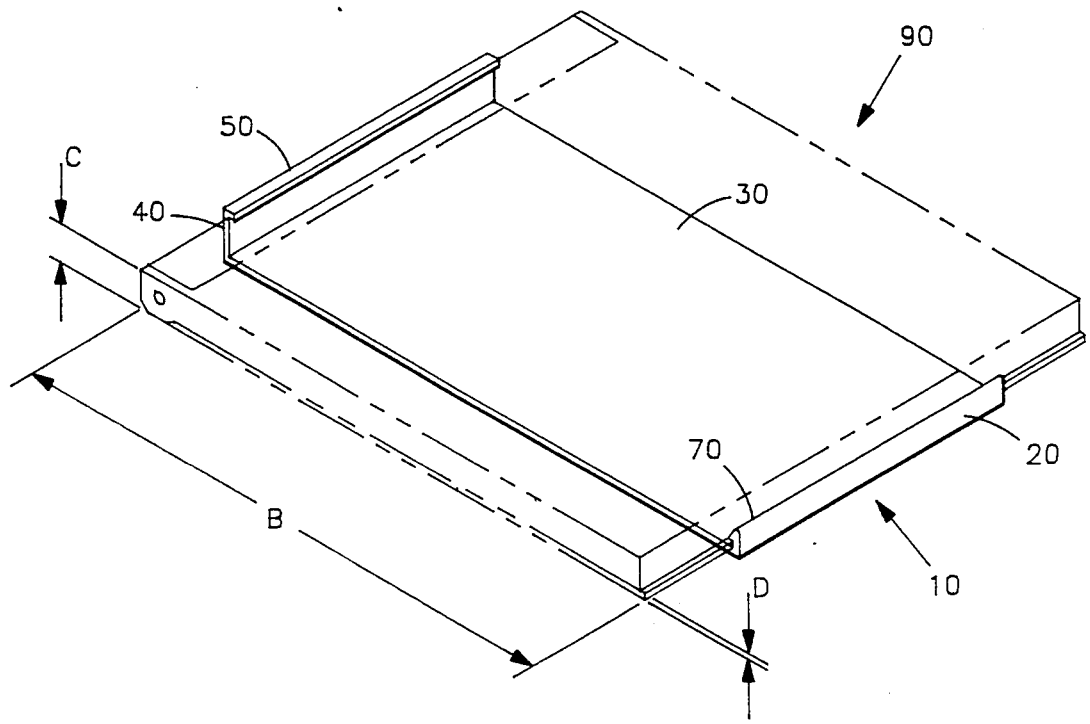
FIG. 1 is a perspective drawing of the invention bracket showing the manner in which a CD case, shown in phantom outline, is clamped and supported.
Figure 2:
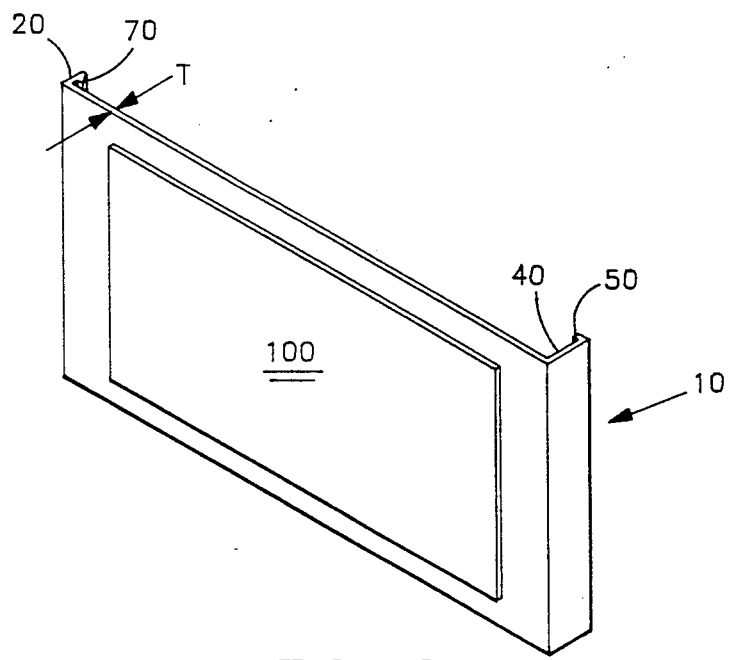
FIG. 2 is a perspective drawing of the invention bracket as viewed from the rear or mounting surface side.
Figure 3:
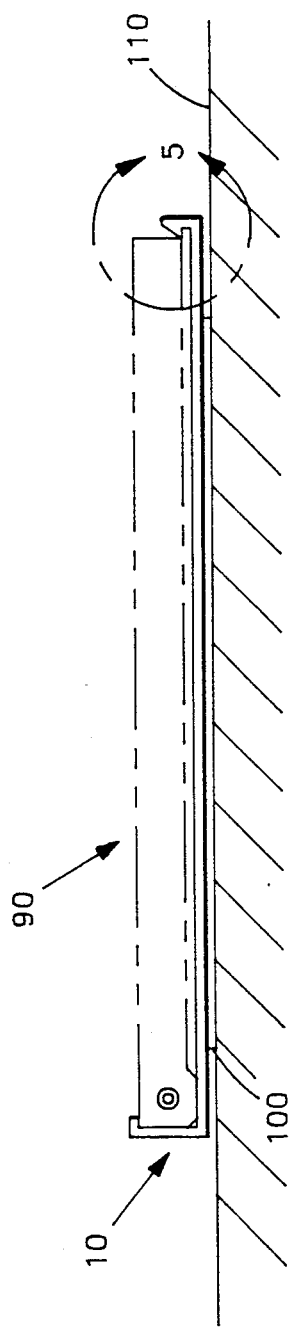
FIG. 3 is a bottom plan view of the invention bracket mounted on a mounting surface and showing the method of clamping the CD case, shown in phantom outline.
Figure 4:
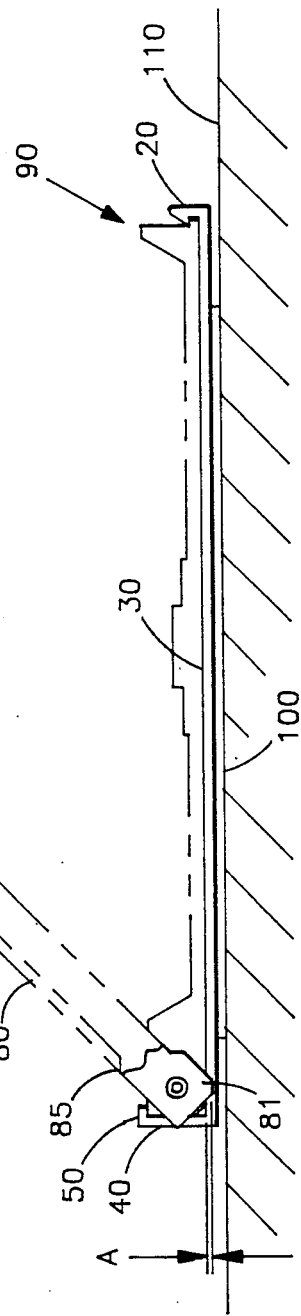
FIG. 4 is a bottom plan view similar to FIG. 3 but showing a CD case cover (in fragment) in a partly open position.
Figure 5A:
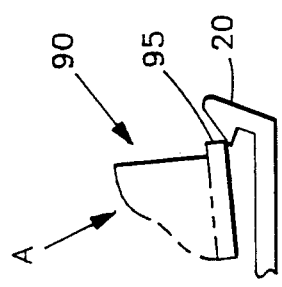
FIG. 5A is a fragmentary view of a clamping detail of one end of the case, (contained within circle 5 of FIG. 3), depicting a method of pressing a CD case against a clamping arm to engage the case with the arm.
Figure 5B:
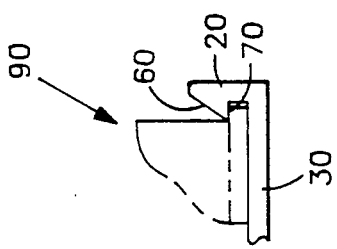
FIG. 5B is a view similar to FIG. 5A, showing the CD case in engagement with the clamping arm, after full insertion into the invention bracket.

FIGS. 1 and 2 illustrate a bracket 10 for supporting a CD case 90 for storing a Compact Disk 150 (FIG.4). The bracket 10 comprises a base 30, and arms 20, 40, arm 20 being a first arm, arm 40 being a second arm, attached to the base 30 on opposite sides thereof. Distal ends of arms 20, 40 have lips 70, 50 respectively, lip 70 being the lip of the first arm, lip 50 being the lip of the second arm, extending toward each other. Adhesive means 100, an adhesive tape or pad, between the bracket 10 and a mounting surface 110, as shown in FIGS. 3 and 4 is used for supporting the bracket 10 on the mounting surface 110. The bracket 10 is formed of any flexible yet strong plastic or similar type of material such as styrene, polyethylene, polypropylene, etc. FIGS. 5A and 5B show the arm 20 having the lip 70 with a sloped exterior surface 60 and a flanged end 95 of the CD case 90 in mutual contact as the CD case 90 is pressed manually in the direction of arrow A. The pressure of the flanged end 95 against the surface 60 forces the arm 20 to flex away from the CD case 90 thereby allowing the flange end 95 to slip past the lip 70. FIG. 5B shows the final result whereby the CD case 90 is fully inserted into the bracket 10 and the arm 20 has returned to its normal position whereby the lip 70 holds the flanged end 95 against the base 30. Insertion of the case 90 into the bracket 10 is accomplished by, first sliding the hinged end 96 under the lip 50 and then pressing the flanged end 95 against sloped exterior surface 60 until the arm 20 flexes away from the case 90 allowing the case 90 to move into a flush position against the base 30, whereupon the arm 20 resumes its normal position, thereby locking the CD case 90 into the bracket 10 by clamping the case 90 under the lips 50 and 70.

In order to provide for effective insertion and support of the case 90 and for opening of the hinged cover 80 while being held in the bracket 10, several dimensions of the bracket 10 are critical. Referring to FIGS. 1 and 2, clearance between the lip 50 and the base 30 is equal to the case dimension (C), while clearance between the lip 70 and the base 30 is equal to the case dimension (D) allowing the case 10 to be wedged between the lips 50, 70 and the base 30. The base 30 has thickness (t) equal to or greater than dimension (A) in FIG. 4, in order to allow the cover 80 to open without the cover arm 81 touching the surface 110. Clearance between the arms 20, 40 is equal to dimension (B) of the case 90 to provide a snug fit and to permit the proper operation of the arm 20 in flexing away from the flanged end 95 during insertion. With case 90 inserted in bracket 10 and bracket 10 attached to mounting surface 110 by adhesive means 100, cover artwork 160 is displayed.

While a particular form of the invention has been illustrated and described, it will be apparent that various modifications can be made without departing from the spirit and scope of the invention. Accordingly, it is not intended that the invention be limited, except as by the appended claims.

I claim:

1. A bracket for supporting a compact disk case on a vertical mounting surface, the case having two opposite vertical sides defining a case width and a hinged cover such that the cover may be moved between a closed position for covering the case, and a open position, through an arc of 180 degrees, the cover lying to one side of the case when the cover is in the open position, comprising:

a planar for attachment to the mounting surface; a first and a second resilient arms attached to the base at opposite sides thereof, the arms extending away from the mounting surface, clearance between the arms being approximately the same as the case width, the end of each arm having a lip, the lips extending toward each other, clearance between the lips and the base being slightly less than the thickness of the case at each lip, such that with the case inserted between the arms, the arms being located at said opposing vertical sides of the case, the case forces the lips to flex generating a restoring force within each arm, whereby the case is prevented from sliding downward by the gripping action of the lips on the case, the lips preventing the case from falling out of the bracket.

2. The bracket of claim 1 wherein the lip of the second arm has a sloped exterior surface that is contacted by the case during insertion of the case into the bracket, the second arm thereby flexing away from the case in response to contact of the case with the sloped exterior surface, thereby allowing the case to move under the lip of the second arm for engagement.

3. A bracket for supporting a compact disk case on a vertical mounting surface, the case having at least two opposite side surfaces defining a case width and a hinged cover such that the cover may be moved between a closed position for covering the case, and a open position, through an arc of 180 degrees, the cover lying to one side of the case when the covers is in the open position, comprising:

a planar base for attachment to the mounting surface; a first and a second resilient arms attached to the base at opposite sides thereof, the arms extending away from the mounting surface, clearance between the arms being approximately the same as the case width, the end of each arm having a lip, the lips extending toward each other, clearance between the lips and the base being slightly less than the thickness of the case at each lip, such that with the case inserted between the arms, the arms being located at opposing said sides of the case, the case forces the lips to flex generating a restoring force within each arm, whereby the case is positively gripped, the lips preventing the case from falling out of the bracket.

* * * * *